United States Patent [19]

Martinson

[11] Patent Number: 4,649,898
[45] Date of Patent: Mar. 17, 1987

[54] APPARATUS FOR CONTROLLING CONDENSATE LEVEL IN STEAM RETORT

[75] Inventor: Edward D. Martinson, DePere, Wis.

[73] Assignee: Martinson Monitors Inc., Green Bay, Wis.

[21] Appl. No.: 586,251

[22] Filed: Mar. 5, 1984

[51] Int. Cl.[4] .................... F24D 1/00; F16K 31/18
[52] U.S. Cl. .................... 126/369; 73/308; 137/429; 137/410; 126/348; 99/330; 99/344; 251/65; 236/52; 340/624; 200/84 C
[58] Field of Search ............. 126/369, 374, 348, 383; 222/51; 137/410, 429; 251/65; 236/52; 219/401; 99/330, 344; 200/84 C; 340/623, 624; 73/308, 313; 361/178

[56] References Cited

U.S. PATENT DOCUMENTS

| | | | |
|---|---|---|---|
| 10,199 | 9/1882 | McLellan | 126/369 |
| 89,419 | 4/1869 | McLellan | 126/369 |
| 1,226,147 | 5/1917 | Trescott | 126/369 X |
| 2,562,723 | 7/1951 | Keller | 126/369 |
| 2,709,919 | 6/1955 | Huttenlock et al. | |
| 2,846,985 | 8/1958 | Blanchard | |
| 3,078,918 | 2/1963 | Malearl et al. | |
| 3,351,084 | 11/1967 | Halkiades | 137/429 X |
| 3,357,247 | 12/1967 | Bardes et al. | |
| 3,675,614 | 7/1972 | Ward et al. | |
| 4,020,481 | 4/1977 | Nakagawa | 340/624 |
| 4,064,755 | 12/1977 | Bongort et al. | 73/313 |
| 4,377,809 | 3/1983 | Lawford | 340/623 |
| 4,418,712 | 12/1983 | Braley | 137/429 X |
| 4,480,469 | 11/1984 | Tice | 200/84 C X |

FOREIGN PATENT DOCUMENTS

323478 8/1902 France ...................... 126/369

Primary Examiner—Randall L. Green
Attorney, Agent, or Firm—James E. Nilles; Thomas F. Kirby

[57] ABSTRACT

Apparatus is provided for controlling the level of steam condensate in a steam retort wherein sealed cans of food are exposed to incoming steam. The apparatus comprises a pneumatically actuated condensate drain valve which is controlled by a solenoid valve and opens to drain condensate if it reaches a dangerously high level, an alarm to indicate when the high level is reached, a recorder to provide a continuous permanent record of condensate level and drain valve status, and an electric control system for sensing condensate level and operating the solenoid valve, the alarm and the recorder in accordance therewith. The electric control system includes a condensate level sensor in the form of a one or more float-operated magnetically-responsive reed switches mounted in the retort. The sensor comprises a hollow stem in which a reed switch is potted in elastomeric non-displaceable material. In one embodiment the control system employs two reed switches and two relays and the drain valve opens when the condensate reaches an upper level and closes when it reaches a lower level. In another embodiment the control system employs one reed switch and a time-delay relay to prevent the drain valve from opening unless the condensate level remains high for a certain length of time. The apparatus is fail-safe in that the drain valve opens if its pneumatic or electric power supplies fail. A thermocouple may be mounted in the sensor to provide temperature indications to the recorder.

25 Claims, 11 Drawing Figures

APPARATUS FOR CONTROLLING CONDENSATE LEVEL IN STEAM RETORT

BACKGROUND OF THE INVENTION

1. Field of Use

This invention relates generally to apparatus for controlling the condensate level in steam retorts, such as canned food cookers or the like.

More specifically, the invention relates to improved electric control means and condensate level sensing means employed therein for operating condensate drain valves and other equipment used in such apparatus.

2. Description of the Prior Art

Steam retorts or steam cookers, which take various forms, are used in the food processing industry to heat and thereby sterilize and/or cook food contained in sealed metal cans. One type of steam retort or cooker takes the form of a large vessel having a sealable chamber in which cans containing the product to be heated are disposed. A cooker on the order of 8 feet high and 6 feet in diameter can hold about 5800 cans of the #303 size (about 16 ounces). Means are provided for continuously injecting high-pressure steam into the chamber at a temperature and for a period of time necessary to completely sterilize and/or cook the product. Steam at pressures up to 20 pounds per square inch and at temperatures up to 350° F. may be injected for periods ranging from 25 minutes to about 4 hours. A condensate well is provided at the bottom of the chamber below the cans to collect the condensate formed as the steam cools after mingling with and heating the cans. For reasons of thermal efficiency and fuel economy, waste space between the level of the condensate and the lowermost layer of cans in the chamber is kept at a minimum. If, for example, the incoming steam is at a temperature of 250° F. (the minimum sterilizing temperature for all products) and sufficient to heat the product being processed, then the temperature of the condensate could be low as 227° F. However, if such low-temperature condensate being collected in the well were to rise and reach the cans, the product in some cans would cool and fail to reach and/or remain at the proper elevated temperature. Improper sterilization creates a risk of product spoilage and the further risks of botulism and loss of product. Accordingly, it is the practice (and required by federal regulations, as explained below) to provide a suitable drain in the condensate well to remove the condensate before its level rises too high and the risk of spoilage can occur. It should be noted that excessive condensate build-up can be caused by relatively low temperature of the product when introduced into the retort chamber, or by can size and length of cooking time required, or by the temperature in the cooking room or any combination thereof. In addition, condensate level variations most often occur during extended cooking and cooling periods common to batch operations, and may not leave a water line sufficient to determine visually what the condensate level is or was.

Because of the health risk, current U. S. Government federal regulations provide:

"The condensate bleeder shall be checked with sufficient frequency to ensure adequate removal of condensate or shall be equipped with an automatic alarm system(s) that would serve as a continuous monitor of condensate-bleeder functioning. Visual checks should be done at intervals of not more than 15 minutes. A record of such checks should be kept to show that the bleeder is functioning properly.

At the time steam is turned on, the drain should be opened for a time sufficient to remove steam condensate from the retort, and provision shall be made for continuing drainage of condensate during the retort operation. The condensate bleeder in the bottom of the shell serves as an indicator of continuous condensate removal."

In compliance with these regulations, it is common practice to visually inspect the condensate build-up regularly or rely on warning devices to determine when the drain should be opened, or to construct the cooker or retort so that steam is continuously blown from a drain which is always open, thus insuring that no condensate build-up occurs. Suitable records are also kept of condensate levels and drain operation. These monitoring procedures are time-consuming and costly. The continuous exhausing of steam to atmosphere is wasteful of energy and extremely costly.

Prior art efforts to monitor condensate levels in steam retorts or cookers and to take appropriate steps with respect thereto, as by initiating drainage and/or recording conditions, have not met with commercial success. In particular, because of the relatively high temperature and pressures encountered in steam cookers or retorts, as well as the presence of moisture, and because of the wide fluctuation of the liquid levels to be sensed and regulated, prior art control systems and liquid level sensing components which are presently available commercially are not well-suited to such an environment.

For example, U.S. Pat. No. 3,357,247, issued Dec. 12, 1967 to Charles Robert Bardes et al, discloses the use of a liquid level sensing device to visually indicate the presence of liquid condensate in a drum pressurized by steam. The following three patents disclose use of float valves to indicate fluid levels: U.S. Pat. Nos. 2,846,985, issued Aug. 12, 1958 to A. G. Blanchard; 3,675,614, issued July 11, 1972 to John T. Ward et al.; 2,709,919, issued June 7, 1955 to G. B. Huttenlock et al. U.S. Pat. No. 3,078,918, issued Feb. 26, 1963 to W. H. Magearl et al. shows use of a float-driven system with appropriate controls and alarms.

SUMMARY OF THE PRESENT INVENTION

In accordance with the present invention, apparatus is provided for controlling the level of steam condensate in a condensate well in a steam retort wherein sealed cans of a product, such as food, are located above the well and exposed to and heated by incoming steam. The apparatus comprises a pneumatically actuated condensate drain valve which is controlled by a solenoid valve and opens to drain condensate if it reaches a dangerously high level, an alarm to indicate when the high level is reached, a recorder to provide a continuous permanent record of condensate level and drain valve status, and an electric control system for sensing condensate level and operating the solenoid valve, the alarm and the recorder in accordance therewith.

The electric control system includes a condensate level sensor or sensing means comprising one or more float-operated magnetically-responsive reed switches mounted in the retort. The sensor further comprises a heat-resistant nonmagnetic hollow stem located in the condensate well and in which each reed switch is potted in a heat-resistant elastomeric axially non-displaceable material.

The sensor also comprises a float movably mounted exteriorly of the hollow stem and movable in response to the level of condensate in the well of the steam retort and a magnet is connected to the float and movable in response thereto for effecting operation of the reed switch or switches.

In one embodiment the control system employs two reed switches and two relays and the drain valve opens when the condensate rises to an upper level and closes when it descends to a lower level. In another embodiment the control system employs one reed switch and a time-delay relay to prevent the drain valve from opening unless the condensate level remains high for a certain length of time. The apparatus is fail-safe in that the drain valve opens if its pneumatic or electric power supplies fail. A thermocouple may be mounted in the sensor to proVide temperature indications to the recorder.

Apparatus and sensing means in accordance with the present invention offer numerous advantages over the prior art. For example, condensate level is automatically regulated in an efficient manner, but in addition, an alarm signal alerts the system operator when an unsafe level is approached, and system conditions are continuously monitored and permanently recorded to provide evidence thereof. The system is failsafe in the event of power failures (electric or pneumatic) and automatically dumps all condensate and prevents further accumulation until the failure is remedied. The sensing means employs commercially available subcomponents which are adapted to withstand a very rigorous high-temperature, high-pressure, damp environment. The sensing means is also well-adjusted to survive large cyclical temperatures and pressure extremes without sustaining damage to its otherwise fragile sub-components, such as the reed switch or thermocouple, or the support and sealing means therefor. The apparatus not only complies with health regulations but offers technical convenience and commercial advantages, including substantial cost savings while in operation. The apparatus is usable with various types of system retorts or cookers, such as continuous, vertical or horizontal cookers. The apparatus includes adjustable components which enhance its adaptability. Other objects and advantages of the invention will hereinafter appear.

DESCRIPTION OF PREFERRED EMBODIMENTS

General Arrangement

Apparatus in accordance with the present invention is provided for controlling the level of steam condensate in a steam retort such as a steam cooker, wherein a product, such as food, in sealed cans is heated to sterilize and/or cook the product. Such steam cookers may take various forms, such as: a continuous cooker wherein cans travel in a spiral track through the retort; or a horizontal batch cooker wherein cans in crates are moved on carts through the retort; or a vertical batch cooker wherein cans are stationarily disposed in the retort. A vertical batch cooker may be of a crateless type wherein cans are randomly dumped onto a screen in the retort and subsequently dumped into cooling water, or of a crate type wherein crates containing cans are lowered into the retort and subsequently removed and lowered into cooling water.

Figure 1:
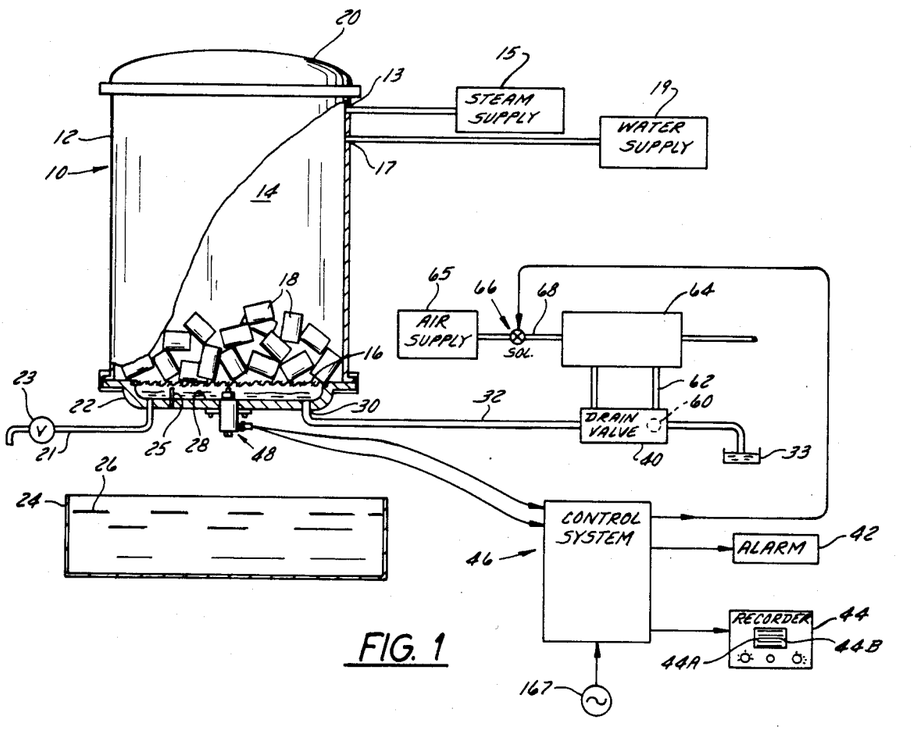
FIG. 1 is a schematic showing of a steam retort in the form of a vertical batch cooker and apparatus in accordance with the invention for controlling the steam condensate level therein.
Figure 2:
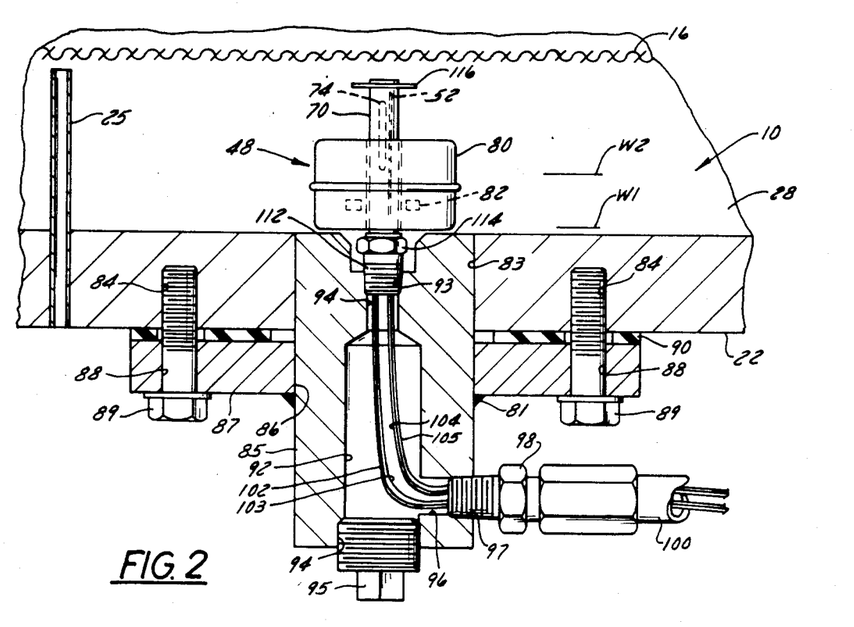
FIG. 2 is a greatly enlarged cross-section view of a portion of the cooker and of the condensate level sensor shown in FIG. 1 and showing the float thereof in a fully lowered position.
Figures 3, 4:
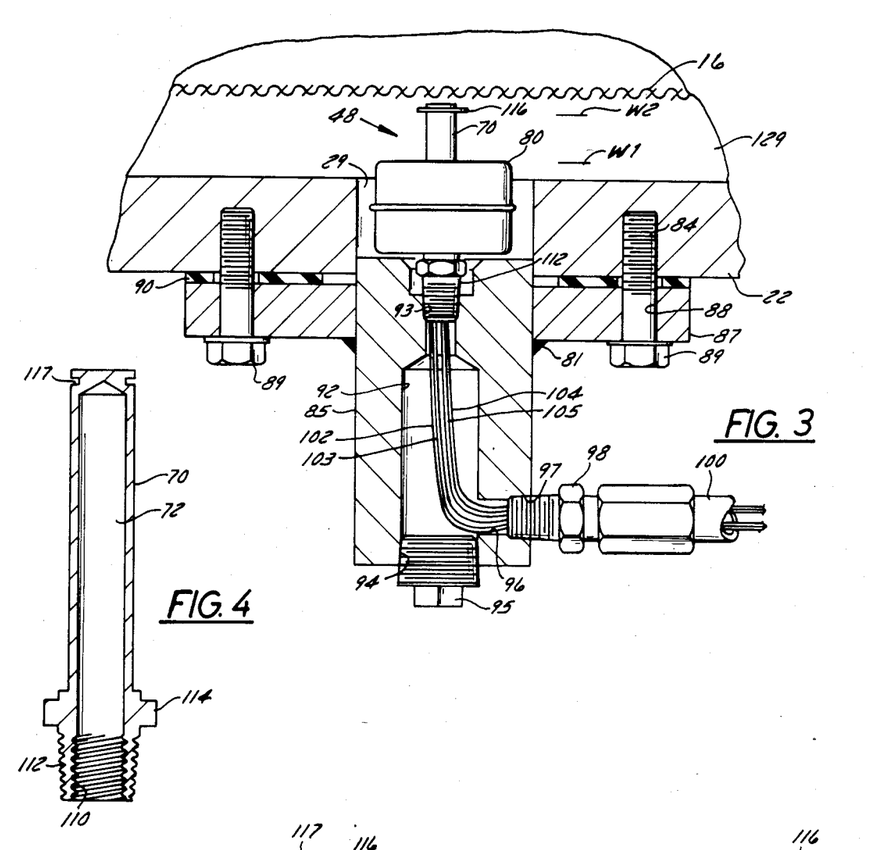
FIG. 3 is a view similar to FIG. 2 but showing the sensor in a slightly different location on a cooker.
FIG. 4 is an enlarged cross-section of the stem of the sensor shown in FIGS. 2 and 3.

FIGS. 1, 2 and 3 disclose crateless type vertical batch steam cooker 10. FIG. 10 discloses a crate type vertical batch steam cooker 210. The apparatus in accordance with the invention is applicable to any of the aforedescribed steam retorts or cookers but is not limited thereto. As FIGS. 1, 9, 10 and 11 show, the apparatus in accordance with the invention comprises a pneumatically actuated condensate drain valve 40 which is controlled by a solenoid valve 66 and a pneumatic actuator 64 and opens to drain condensate if it reaches a dangerously high level in a condensate well 28 in retort 10. The apparatus also comprises an alarm 42 to indicate when the high level is reached, a recorder 44 to provide a continuous permanent record of condensate level and drain valve status, and an electric control system 46 for sensing condensate level and operating the solenoid valve 66, the alarm 42 and the recorder 44 in accordance therewith. As FIGS. 1 through 7, 10 and 11 show, the electric control system 46 includes a condensate level sensor 48 comprising one or more float-operated magnetically-responsive reed switches 74. The sensor 48 comprises a hollow stem 70 mounted in the retort 10 in which each reed switch 74 is potted in elastomeric nondisplaceable material.

Figure 10:
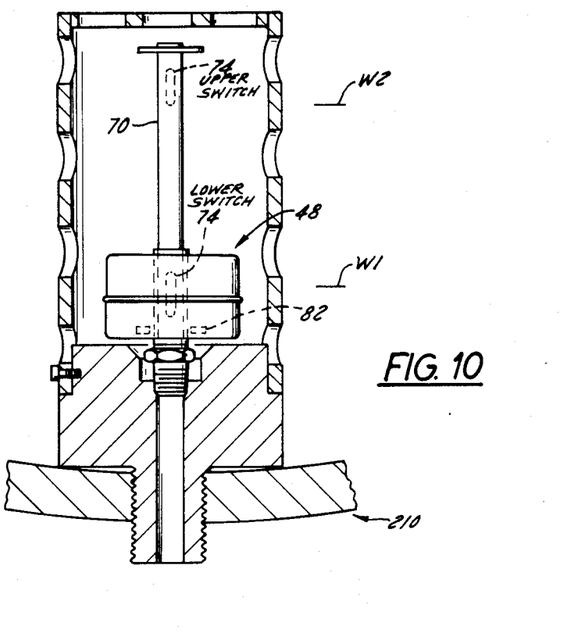
FIG. 10 is a cross-section view of another form of condensate level sensor and of a portion of a cooker with which it is used.
Figure 11:
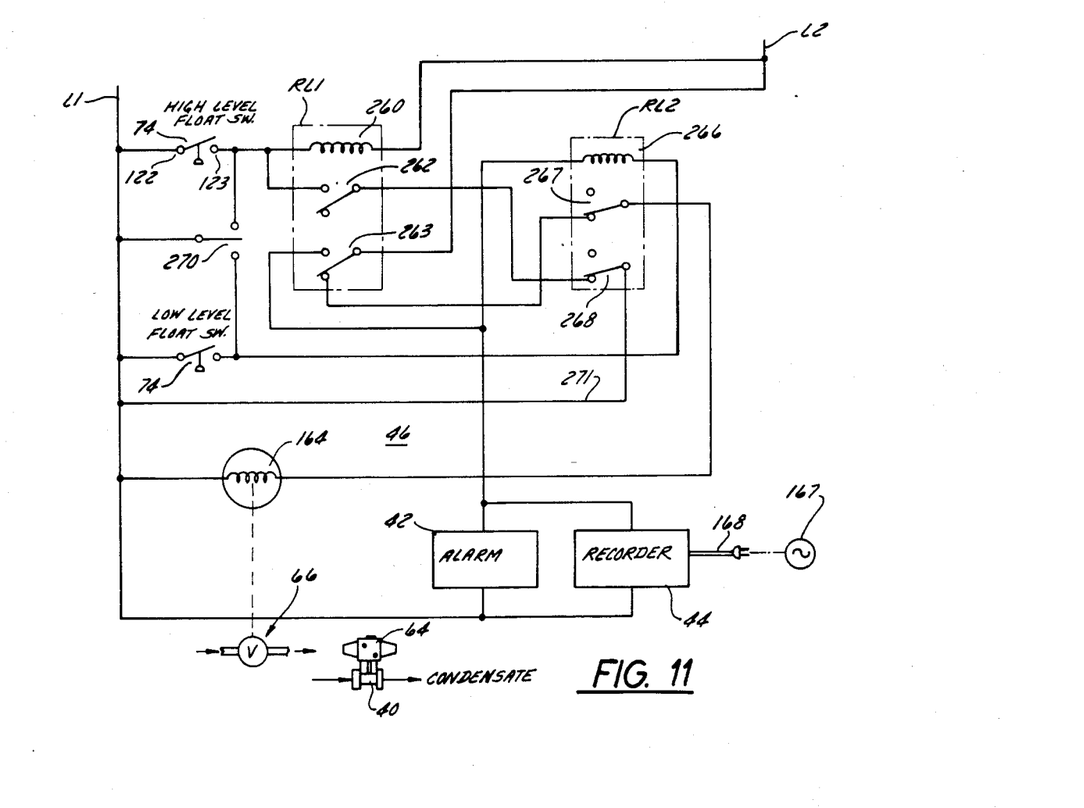
FIG. 11 is an electric circuit diagram of a control system in which the sensor of FIG. 10 is employed.

As FIGS. 10 and 11 show, in one embodiment the control system 46 employs two reed switches 74 and two relays RL1 and RL2, and the drain valve 40 opens when the condensate reaches an upper level W2 and closes when it reaches a lower level W1.

Figure 6:
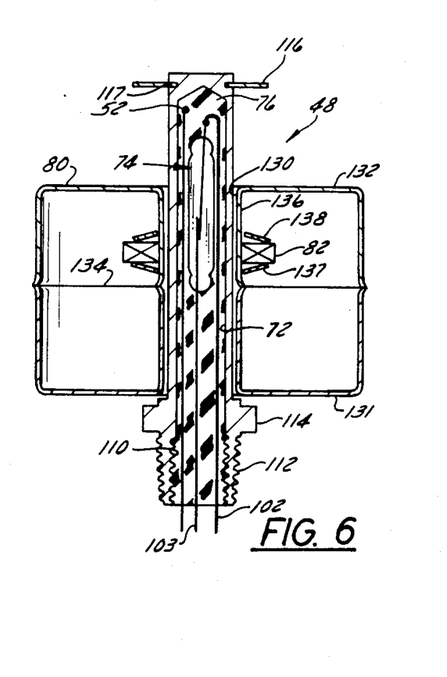
FIG. 6 is a view similar to FIG. 5 but showing the float reversed so that the float magnet is positioned to effect switch opening if the float is raised and showing a thermocouple embedded alongside the reed switch.
Figure 7:
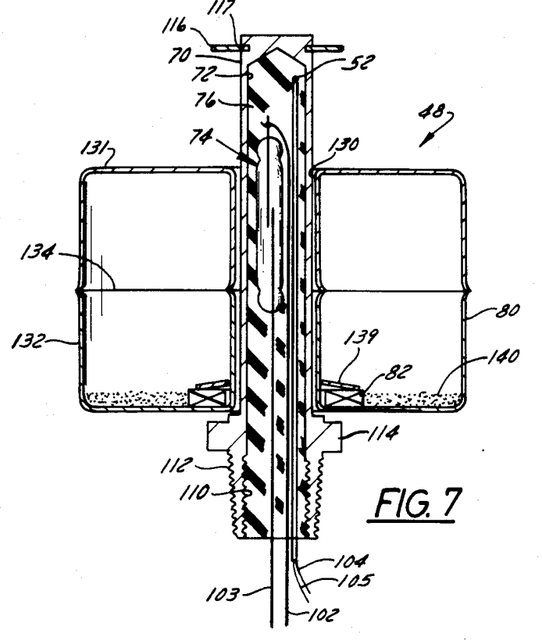
FIG. 7 is a view similar to FIG. 6 but showing another placement of the float magnet.
Figure 9:
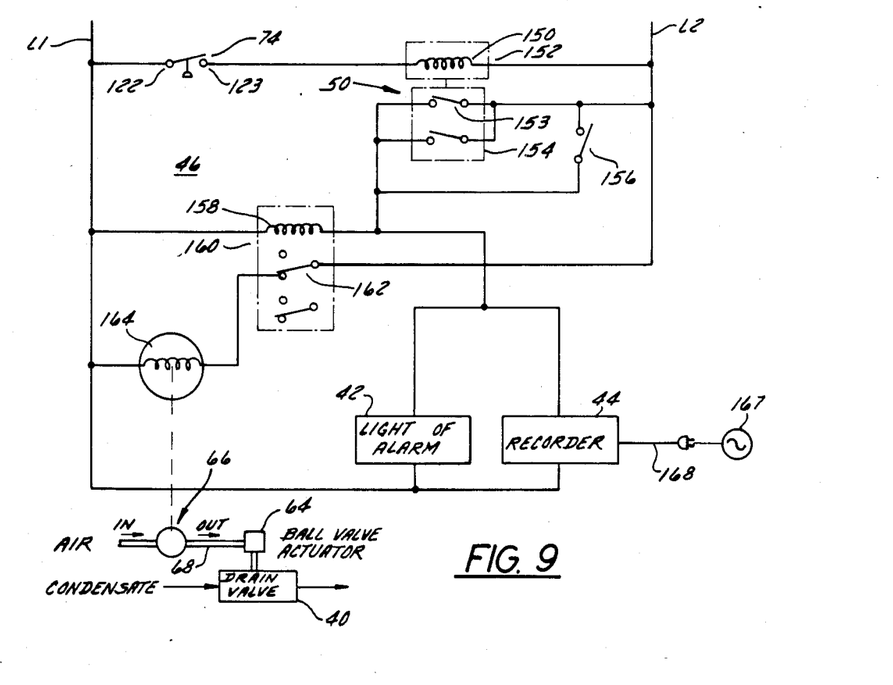
FIG. 9 is an electric circuit diagram of the control system shown in FIG. 1.

As FIGS. 2, 3 and 9 show, in another embodiment the control system 46 employs one reed switch 74 and a time-delay relay 50 to prevent the drain valve 40 from opening unless the condensate level remains at a high or upper level W2 for a certain length of time. The apparatus is fail-safe in that the drain valve 40 opens if its pneumatic or electric power supplies fail. A thermocouple 52 may be mounted in the sensor 48 to provide temperature indications to the recorder 44, as FIGS. 6 and 7 show.

First Embodiment

Referring to FIGS. 1 and 2, the crateless type vertical batch steam cooker or retort 10 comprises a housing or shell 12 having a chamber 14 therein with a support screen 16 near the bottom thereof in the form of a steel plate having ¾" perforations therethrough. Housing 12 is provided with a steam injection port 13 for admitting high-pressure, high-temperature steam into chamber 14 from a steam supply or source 15. Housing 12 is also provided with a water injection port 17 for admitting water into chamber 14 from a water supply or source 19. The chamber 14 is shown filled with sealed metal cans 18 which are understood to be filled with a product, such as food, which is to be sterilized and/or cooked in the cans by exposing the cans to steam within chamber 14 for a predetermined time and at a predetermined temperature. Cooker 10 further comprises a top fill door 20, shown in closed and sealed condition but which can be opened to receive the cans 18. Cooker 10 also comprises a bottom discharge door 22, shown in closed and sealed condition on which the support screen 16 is mounted and which can be slidably shifted horizontally to open position to enable the cans 18 to fall into a container 24 of cooling water 26 located beneath cooker 10 after heating of the product is complete. Discharge door 22 is provided on its inside surface beneath screen 16 with a depression which serves as a condensate well 28 in which condensed steam accumulates during a cooking operation. Discharge door 22 is provided with a large water discharge port 21 controlled by a manually operable water discharge valve 23 for draining water from chamber 14. Discharge door 22 is also provided with an emergency overflow standpipe 25. Discharge door 22 is also provided with a drain port 30 therethrough communicating with well 28 to which a drain pipe or conduct 32 is connected for discharging condensate to a reservoir 33. For the sake of thermal efficiency and to reduce operated costs, the volumetric capacity of condensate well 28 at the space beneath screen 16 needs to be kept to a minimum, first, so that no excess space exists in chamber 14 of cooker 10 for containing steam which is not directly employed in heating the cans 18 and, second, so that the volume of condensate cannot accumulate to an amount which consumes steam heat which would otherwise be available for cooking. As a result, the vertical space between the floor of well 28 and the screen 16 is relatively small, i.e., on the order of ¾" to about 1⅜ inches in a typical cooker 10.

In a typical cycle of operation, cooker 10 is loaded and unloaded as follows. Bottom discharge door 22 is closed and sealed, water discharge valve 23 is closed, drain valve 40 is closed and water supply 19 is turned on to fill chamber 14, and then turned off. Loose cans 18 are then randomly dumped into chamber 14 through open top fill door 20; the water chamber 14 breaking their fall and preventing one can from damaging another as they fall and pile up. When chamber 14 is filled with cans 18, water discharge valve 23 is opened to drain water from chamber 14 and then reclosed. Top fill door 20 is closed and sealed and steam is injected into chamber 14 from steam supply 15 to effect desired heating. Drain valve 40 operates as required to remove condensate, as hereinafter described, and when sterilizing and cooking is complete, bottom discharge door 22 is slid open and the cans 18 fall into cooling water 26, whereupon the cycle is complete.

As FIG. 1 makes clear, the apparatus in accordance with the invention for controlling the condensate level in condensate well 28 of cooker 10 operates to prevent the condensate from reaching or exceeding the height of the screen 16 and coming into contact with any of the cans 18 thereabove, which contact causes a reduction in temperature of the cans and the product therein from a desired predetermined level to some lower unsafe level. The apparatus comprises drain valve 40 in drain conduit 32 which operates to drain well 28 when the condensate reaches some predetermined upper water level W2 (see FIG. 2) below screen 16 which is deemed to be unsafe and poses a risk of can contact. The apparatus also comprises alarm 42 which operates to visually and/or audibly warn the human attendant or operator when upper water level W2 is reached so that he is aware of the risk and can initiate other action if necessary. If the water level does approach the bottom of the screen 16, pipe 25 enables it to overflow and prevents it from reaching the cans 18. The apparatus further comprises recorder 44 which operates to provide a continuous indication and permanent record of condensate levels versus time, status of drain valve 40 (open or closed) hereinbefore identified, condensate temperature, and if preferred, other system activities.

The apparatus also comprises an electric control means or system, generally designated 46, for sensing condensate levels and for operating the valve 40, the alarm 42 and the recorder 44 accordingly. The control means 46 comprises condensate level sensing means or sensor 48 mounted in discharge door 22 and extending into condensate well 28. In the embodiment shown in FIG. 9, a time delay relay device 50 is used to prevent drain valve 40 from opening in response to sensor 48 unless the condensate remains at or above upper level W2 for a predetermined interval of time. In the embodiment shown in FIGS. 10 and 11, two reed switches 74 and two relays RL1 and RL2 are used to open and close the drain valve 40 when upper and lower condensate levels, respectively, are reached. In the embodiment shown in FIGS. 6 and 7, temperature sensing means 52 are also mounted in sensor 48 and extend into condensate well 28 to provide a temperature read-out to recorder 44.

The hereinbefore mentioned drain valve 40 comprises a valve member 60 connected to a reciprocably movable valve stem 62 and movable to open and full closed position by means of a pneumatic actuator 64. Actuator 64 receives pressurized air from an air supply or source 65 through a conduit 68 and conduit 68 is provided with solenoid valve 66 having open and closed positions and controls air flow to actuator 64 in response to operation of control system 46. Valve 40 is normally open and closes when normally closed solenoid valve 66 is opened in response to control system 46 to admit air from air supply 65. Thus, if electrical power fails or air supply fails, valve 40 automatically assumes a fail-safe open position to sssure full drainage of condensate well 28.

Valve 40 may take the form of a Model 82-144-0-1 available from Apollo Ball Valve, ComBraCo Industries, Pageland, S.C. 29728.

Actuator 64 may take the form of a Model P.E. 1.5 SR EL-O-MATIC actuator available from the EL-O-

MATIC Company, One University Plaza, Hackensack, N.J. 07601 and described in their literature.

Solenoid valve 66 may take the form of a Type C3121 three-way solenoid valve available from Brunswick Technetics, 60 Production Court, New Britain, Conn. 06051.

The hereinbefore-mentioned alarm 42 may take the form of an audible alarm comprising an electrically operated bell, buzzer or siren or may take the form of a visual alarm comprising an electric light or could combine both forms.

The hereinbefore-mentioned recorder 44 may take the form of a commercially available durable rugged electromechanical instrument which provides continuous recordings. The chart paper 44A continuously passes the recording pen 44B, making it possible to determine from the chart the actual time an event occurred, the duration of time the event lasted, and the sequence of events recorded. One automatic recorder can handle for example, up to eight pressure cookers. The recorder 44 shows the frequency of steam trap valve 40 functioning, and also provides an automatic indication of continuous condensate removal.

Although ink or inkless recorders could be used, an inkless recorder employing a stylus 44B and pressure sensitive chart paper 44A is preferred because of the moist environment.

Recorder 44 may take the form of a 4-channel or 8-channel event recorder (models 292-HIV-4 and 292-HIV-8, respectively) available from Gulton Industries, Inc., Gulton Industrial Park, East Greenwich, R.I. 02818, and described in that company's Manual No. 17003.

Referring now to FIGS. 2 and 4 through 8, the condensate level sensing means or sensor 48 takes the form of a heat-resistant pressure-resistant magnetically operated float switch which comprises a non-magnetic heat-resistant stem or housing 70 having a chamber 72 therein and extendable into wall 28 into a fixed position. A sealed magnetic reed switch 74 is disposed within chamber 72. Means are provided for mounting reed switch 74 in a fixed position within stem 70 and comprise a resiliently compressible heat-resistant pressure-resistant potting material 76 disposed in bore 72 between reed switch 74 and the wall of the stem. A float 80 is movably mounted exteriorly of stem 70 and is movable in response to the level of condensate in well 28. A magnet 82 is connected to float 80 and is movable in response thereto for effecting operation of the reed switch 74.

FIG. 2 shows the manner in which sensor 48 is mounted on cooker 10. Thus, discharge door 22 is provided with a central cylindrical opening 83 therethrough and around which are concentrically arrayed four threaded blind bolt holes 84, only two of which are shown. A hollow adjustment cylinder 85 is provided and extends through a circular hole 86 in a mounting plate 87 to which it is welded in sealed relationship as at 81 to prevent water or steam leakage. Cylinder 85 is located on plate 87 in accordance with the particular thickness of door 22. Mounting plate 87 has four bolt holes 88 therethrough (only two of which are shown) for receiving bolts 89 which secure mounting plate 87 to door 22. An asbestos gasket 90 lies between plate 87 and door 22 to prevent leakage from opening 83 past cylinder 85.

Comparison of FIGS. 2 and 3 show how cylinder 85 may be adjustably positioned relative to its mounting plate 87 to enable sensor 48 to be used in a relatively deep space 29 between well 28 and screen 16 (FIG. 2) or in a relatively shallow space 129 between well 28 and screen 16 (FIG. 3) wherein the range of travel of float 80 would otherwise be quite limited. In the arrangement of FIG. 2, the magnet 82 is mounted at the position shown in FIG. 5. In the arrangement of FIG. 3, the magnet 82 is mounted at the position shown in FIG. 7.

Cylinder 85 has a bore 92 extending axially therethrough which is threaded at its upper end at 93 to threadedly receive the threaded lower end of stem 70 and is threaded at its lower end at 94 to threadedly receive a plug 95. A transverse bore 96 intersects bore 92 and is threaded at 97 to receive a threaded fitting 98 at the end of insulating tube or hose 100 fabricated of Teflon (TM) and shielded by stainless steel braid. Such a hose may take the form of type R115-6 hose with type Y70306-3 fittings available from Titeflex Industrial Products Company, 170 Tapler St., Springfield, Mass. 01104. The bores 92 and 96 serve as passages for two insulated electrical conductors or wires 102 and 103 which are connected to reed switch 74 and for two insulated electrical conductors or wires 104 and 105 which are connected to the thermocouple 52. When the wires are in place, plug 95 is screwed in place. The wires 102, 103, 104, 105 are electrically insulated with heat-resistant Teflon insulation and are available as Type 12207 wire from American Electronic Wire Company, 1055 Sesame St., Bensenville, Ill. 60106. Cylinder 85, plate 87 the bolts 89, plug 95, fitting 98, stem 70 and float 80 are each fabricated of material, such as stainless steel, which is, of course, heat-resistant and non-magnetic.

FIG. 4 shows that chamber 72 in stem 70 is defined by a blind bore which is closed at one end and internally threaded as at 110 at its open end. The internal threads 110 operate to engag the potting material 76 in bore 72 to prevent its axial withdrawal. Stem 70 is provided with external threads 112 at its lower end for engagement with threaded bore 93 in cylinder 85 and is also provided with a nut-shaped external flange 114 for engagement with a tool, such as a wrench (not shown) employed during installation or removal of stem 70. Flange 114 also serves as a lower stop for float 80 which is slidably mounted on stem 70. A snap-ring 116 is removably engaged in an annular groove 117 near the upper end of stem 70 and serves as an upper stop for float 80.

Figure 5:
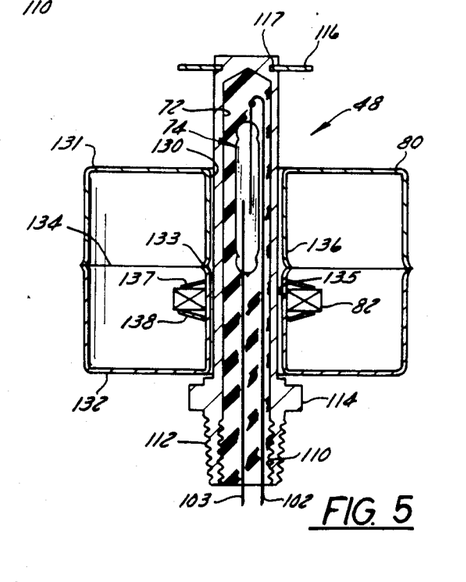
FIG. 5 is a cross-section view of the sensor of FIG. 2 and showing a normally open reed switch potted in the stem and showing the float magnet positioned to effect switch closure if the float is raised.
Figure 8:
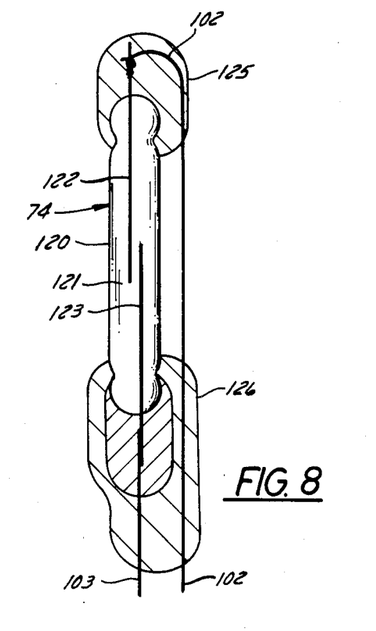
FIG. 8 is an enlarged view, partly in cross-section, showing the manner in which the reed switch is electrically connected and insulated.

As FIGS. 5 and 8 best show, reed switch 74 which is mounted in chamber 72 of stem 70 takes the form of a commercially available device comprising a glass housing 120 having a vacuum chamber 121 therein into which normally disengaged movable reed contacts 122 and 123 axially extend from opposite ends of the housing 120. A type MR 108 reed switch from Gordos Corporation, 250 Glenwood Ave., Bloomfield, N.J. 07003 may be employed. As FIG. 8 best shows, the aforementioned conductor wire 102 is connected at its end by a wrap solder joint to the external end of reed contact 122 and lies alongside and generally parallel to switch 74. A short piece 125 of heat-shrinkable sleeve-like or tube-like electrical insulation surrounds the wrap solder joint, the external end of reed contact 122, and the upper end of glass housing 120. The aforementioned conductor wire 103 is connected by a lap solder joint to the external end of reed contact 123 and a relatively long piece 126 of heat-shrinkable sleeve-like electrical insulation surrounds the lap solder joint, the external end of contact 123, the lower end of glass housing 120 and a portion of wire 102 which lies parallel to the glass tube. The heat-shrinkable tubing may take the form of type Hug-18-4PB irradiated polyolefin shrinkable tubing available from Russell Industries, Inc., Oceanside, N.Y. 11572.

The reed switch 74 with wires attached is embedded in the potting material 76 in bore 72 of stem 70. In the embodiment shown in FIGS. 6 and 7, the thermocouple 52 to which tefloncoated wires 104 and 105 are connected by solder joints is also embedded in the potting material 76. The potting material 76 is commercially available and is a type which passes from a liquid phase or state in which it is poured into bore 72 to a solid phase or state in which it remains resiliently compressible instead of becoming absolutely hard or rigid as do some other potting compounds such as epoxies. The sensor 48 and the various materials employed in the construction thereof are subjected during operation of cooker 10 to cyclical extremes in temperature (from 50° F. to 350° F., for example) and in pressure (from atmospheric to 20 psi, for example). Furthermore, because of the differences in the modules of expansion and contraction between stainless steel stem 70 and conventional rigid potting materials such as epoxy, such temperature extremes would cause a pressure build-up to fracture the glass housing 120 of reed switch 74 and/or cause disengagement of the potting slug from the walls of bore 72 of stem 70 and slippage of the slug partially or completely out from bore 72 resulting in inaccurate float switch behavior. Use of resiliently compressible potting material 76 to prevent breakage of glass housing 120 and the presence of the mechanically engaging internal threads 110 prevents axial displacement of the potting material in bore 72.

The potting material 76 may take the form of Dow-Corning Type Sylgard 170 A and B elastomer silicone potting compound available from Dow-Corning Corp., Midland, Mich. 48604. Before this potting compound is poured, the walls of bore 72 are given a primer coating of Dow-Corning 1200 prime coat which is allowed to dry for one hour and enhances adhesion of the potting material 76.

Stem 70 extends upward into condensate well 28 and float 80 is slidably mounted thereon. Float 80 preferably takes the form of a commercially available device torroidal in form and having a central hole 130 through which stem 70 extends. A float such as type 53800-5 from Seymour-Sheridan, Inc., 264 Seymour St., Stratford, Conn. 06497 may be employed. Float 80 comprises two sections 131 and 132 which are welded together along inner and outer circumferential seams 133 and 134 to provide an internal space 135 of torroidal shape in which the magnet 82 is rigidly mounted. Magnet 82 is preferably of torroidal shape and has a central opening 135 which accommodates the cylindrical neck 136 of one section 131. Magnet 82 is rigidly held in a fixed position within float 80 by means of a pair of spaced apart metal washers 137 and 138 which are friction-fitted or "window-locked" to neck 136 and between which the magnet is disposed. As comparison of FIGS. 5 and 6 makes clear, the aforedescribed mounting arrangement of magnet 82 in float 80 enables reed switch 74 (which has normally open contacts when not subjected to a magnetic field) to function as a normally open switch when float 80 is in lowered position (see FIG. 5) or to function as a normally closed switch when float 80 is reversed on stem 70 and is in lowered position (see FIG. 6). Such reversal capability is useful in that it makes sensor 48 compatible with electric control systems such as 46 which may have different input signal requirements. FIGS. 3 and 7 show an arrangement wherein the magnet 82 is located at the very bottom of float 80, being held in place by a single washer 139, and associated with ballast 140 in the form of sand disposed at the bottom of float 80. As will be understood, turbulence and wave action occur in the shallow condensate well 28 of the cooker 10 during operation. The inertia created by the ballast 140 and the fact that float 80 (if properly weighted) will rise off the bottom only after it is nearly submerged in condensate serves to mitigate or eliminate the risk of spurious or fluttering signals being transmitted by reed switch 74 due to the float responding to waves and other turbulence in the condensate well. Thus, more accurate and consistent performance results in some installations.

The control system 46 shown in FIG. 9 comprises a pair of electric power supply lines L1 and L2 which are understood to be connected to a suitable electrical power source (not shown) such as a 120 volt a.c. power supply. The normally open contacts 122 and 123 of reed switch 74 are connected between lines L1 and L2 in a series circuit with the relay coil 150 of a magnetic control relay 152 which operates a normally open relay contact 153 in an adjustable pneumatic time delay device 154 which can be adjusted to remain open for a predetermined interval of time after relay coil 150 is energized and then close for a predetermined interval of time before re-opening. A normally open test switch 156 is connected in parallel with contact 153. The relay contact 153 is connected in series circuit with a relay coil 158 of a control relay 160 between lines L1 and L2. Control relay 160 comprises a normally closed relay contact 162 which is in series with the solenoid coil 164 between lines L1 and L2. When solenoid coil 164 is energized, solenoid valve 66 is open allowing air flow to pneumatic actuator 64 and causing drain valve 40 to remain closed. The alarm 42 is connected in series circuit with relay contact 153 between lines L1 and L2. The recorder 44, which is connected to receive operating power from a source 167 by means of a line cord 168 is connected in series circuit with relay contact 153 between lines L1 and L2 to receive signal power which operates its stylus to record valve condition.

The control system 46 of FIG. 9 operates as follows. Assume that recorder 44 is energized from source 167. When the condensate level in well 28 of cooker 10 rises to a predetermined level, float 80 rises to a level wherein it effects closure of the contacts 122–123 of reed switch 74. This energizes relay coil 150 and, after a predetermined interval of time, the contacts 153 close, energize alarm 42, to start recorder 44 and to cause energization of relay coil 158, whereupon the contacts 162 open. When the contacts 162 open, solenoid coil 164 becomes de-energized, solenoid valve 66 closes, air flow to pneumatic actuator 64 ceases, and drain valve 40 opens to allow discharge of the condensate from well 28. When the condensate level recedes to a lower level whereat the reed switch contacts 122–123 re-open, the contacts 153 re-open, the contacts 162 re-close, the alarm 42 stops, the recorder 44 stops, the solenoid valve 66 re-opens, the drain valve 40 re-closes, and the timer 154 resets.

The timer 154 resets automatically after each cycle. The timer can be pre-set for any desired period up to 15 minutes. The timer provides a delay or damper in the float switch circuit. Tests have proven that when the float switch is near the point of contact, minor turbulence or ripples on the surface of cooker condensate will cause the internal reed switch to make and break contact many times in one second. A properly adjusted timer assures a smooth, complete cycle with the initial reed switch contact. The ripple effect may cause the pneumatic relay coil to 'chatter'. This is normal.

Timer relays 152, 154 and 160 may take the form of type "L", "LT" and "KP-12" devices, respectively, commercially available from the Square "D" Company, P.O. Box 472, Milwaukee, Wisc. 53201.

Second Embodiment

The control system 46 shown in FIG. 11 also comprises a pair of electric power supply lines L1 and L2 and the normally open contacts 122–123 of upper reed switch 74 are connected between lines L1 and L2 in series circuit with the relay coil 260 of a relay RL1 which comprises a pair of single pole double throw contacts 262 and 263. A lower reed switch 74 is connected in series circuit with the relay coil 266 of a relay RL2 which comprises a pair of normally closed contacts 267 and 268. A test switch 270 in the form of a single pole double throw normally open switch is connected in parallel with either of the two reed switches 74. The solenoid coil 164 of solenoid valve 66 is connected in series circuit with contact 267 of relay RL2 and with contact 263 of relay RL1 between lines L1 and L2. Coil 164 is energized when both relays RL1 and RL2 are de-energized. A holding circuit 271 for coil 260 of relay RL1 is connected in parallel with upper reed switch 74 and comprises contact 268 of relay RL2 and contact 262 of relay RL1 to maintain relay coil 260 energized after upper float switch 74 re-opens as the condensate level recedes and until lower reed switch 74 re-closes.

Alarm 42 and recorder 44 are connected in parallel with each other and in series circuit with contact 263 of relay RL1 between lines L1 and L2.

The sequence of operation of the contact system 46 shown in FIG. 11 is best understood by referring to the following table:

| Float 48A | Lower Switch 74 | Upper Switch 74 | Solenoid Valve 66 | Valve 40 | RL2 Relay Coil | RL1 Relay Coil |
|---|---|---|---|---|---|---|
| Open | close | open | on | close | off | off |
| Mid | open | open | on | close | off | off |
| Top | open | close | off | open | on | on |
| Mid | open | open | off | open | on | on |
| Bottom | close | open | on | close | off | off |

I claim:

1. Apparatus for controlling the level of steam condensate in a steam retort comprising:
   drain valve means operable to regulate drainage of said condensate from said retort;
   and control means for operating said drain valve means in response to the condensate level in said retort, said control means comprising:
   sensing means for providing a first signal when condensate rises to a predetermined level to effect opening of said drain valve means and for providing a second signal when condensate falls below said predetermined level to effect closing of said drain valve means;
   said sensing means comprising magnetic float switch means comprising: a non-magnetic stem having a chamber therein and extendable into said steam retort in a fixed position;
   a magnetic reed switch disposed within said chamber in said stem;
   means for mounting said reed switch in a fixed position within said stem;
   a float movably mounted exteriorly of said stem and movable in response to the level of said condensate in said steam retort;
   and a magnet connected to said float and movable in response thereto for effecting operation of said reed switch,
   said control means further comprising time delay means responsive to said first signal to prevent opening of said drain valve means until a predetermined time interval elapses and said sensing means is still providing said first signal.

2. Apparatus according to claim 1 further comprising recording means operable by said control means to monitor and provide a permanent record of condensate levels.

3. Apparatus according to claim 1 further comprising alarm means operable by said control means to provide an alarm signal when said condensate reaches a predetermined upper level.

4. Apparatus according to claim 1 wherein said magnetic float switch means comprising a plurality of magnetic reed switches disposed in said chamber and axially displaced from one-another.

5. Apparatus according to claim 4 including first and second relay means responsive to said plurality of reed switches whereby said sensing means provides a first signal when condensate rises to a predetermined level to effect opening of said valve means and provides a second signal when condensate falls below said predetermined level to effect closing of said valve means 6. Apparatus according to claim 1 further comprising a thermo-couple mounted in said stem for providing a temperature signal.

7. Apparatus according to claim 1 or 4 or 6 wherein said means for mounting said reed switch in a fixed position within said stem comprises resiliently compressible potting material disposed between said reed switch and the wall of said chamber in said stem, and wherein said stem comprises means engageable with said potting material to prevent axial displacement thereof.

8. Apparatus for controlling the level of steam condensate in a steam retort comprising:
   drain valve means operable to regulate drainage of said condensate from said retort;
   control means for operating said drain valve means in response to the condensate level of said retort, said control means comprising:
   sensing means for providing signals when said condensate reaches a predetermined level to effect operation of said drain valve means;
   said sensing means comprising a magnetic float switch means comprising: a non-magnetic stem having a chamber therein and extendable into said steam retort in a fixed position;
   a magnetic reed switch disposed within said chamber in said stem;
   means for mounting said reed switch in a fixed position within said stem and comprising resiliently compressible potting material disposed between a reed switch and the wall of said chamber in said stem, and wherein said stem comprises means engageable with said potting material to prevent axial displacement thereof;

a float movably mounted exteriorly of said stem and movable in response to the level of said condensate in said steam retort;

and a magnet connected to said float and movable in response thereto for effecting operation of said reed switch;

said sensing means providing a first signal when condensate rises to a predetermined level to effect opening of said drain valve means and for providing a second signal when condensate falls below said predetermined level to effect closing of said valve means;

and wherein said control means further comprises time delay means responsive to said first signal to prevent opening of said drain valve means until a predetermined time interval elapses and said sensing means is still providing said first signal;

recording means operable by said control means to monitor and provide a permanent record of condensate levels;

and alarm means operable by said control means to provide an alarm signal when said condensate reaches a predetermined upper level.

9. Apparatus according to claim 8 further comprising a thermocouple mounted in said stem for providing a temperature signal.

10. Apparatus for controlling the level of condensate in a steam retort comprising:

valve means operable to drain said condensate from said retort and closable to prevent such drainage;

and control means for operating said valve means in response to the condensate level in said retort, said control means comprising:

sensing means for providing a first signal when condensate rises to a predetermined level to effect opening said valve means and for providing a second signal when condensate falls below said predetermined level to effect closing of said valve means;

and time delay means responsive to said first signal to prevent opening of said valve means until a predetermined time interval elapses and said sensing means is still providing said first signal.

11. Apparatus according to claim 10 further comprising alarm means responsive to said control means to provide an alarm signal when said predetermined time interval has elapsed and said sensing means is still providing said first signal.

12. Apparatus according to claim 11 further comprising recording means responsive to said control means to continuously monitor and provide a permanent record of condensate levels and operation of said valve means.

13. Apparatus according to claim 10 or 11 or 12 including means to effect opening of said valve means in the event of failure of the power supply for operating said valve means or said control means.

14. Apparatus according to claim 13 wherein said sensing means comprises magnetic float switch means comprising:

a non-magnetic heat-resistant stem having a chamber therein and extendable into said steam retort into a fixed position;

a sealed magnetic reed switch disposed within said chamber in said stem;

means for mounting said reed switch in a fixed position within said stem housing;

a float movably mounted exteriorly of said stem and movable in response to the level of condensate in said steam retort;

and a magnet connected to said float and movable in response thereto for effecting operation of said reed switch.

15. Apparatus according to claim 14 wherein said means for mounting said reed switch in a fixed position within said stem comprises resiliently compressible potting material disposed between said reed switch and said wall of said chamber in said stem.

16. Apparatus according to claim 15 wherein said wall of said chamber in said stem comprises projecting means engageable with said potting material to prevent axial displacement thereof.

17. Apparatus according to claim 16 including temperature sensing means mounted within said stem for providing a temperature signal hermo-couple mounted in said stem for providing a temperature signal.

18. Apparatus according to claim 16 wherein said float is hollow and torroidally shaped and has an opening therethrough for accommodating said stem on which said float is slideably mounted, and wherein said magnet is mounted within the hollow float.

19. Apparatus according to claim 18 wherein said magnet is mounted in said float near one end of said float and wherein said float is reversably mountable on said stem to effect reverse operation of said reed switch.

20. Sensing means for sensing the level of liquid in a container and mountable on a bottom wall of said container, said wall having a hole extending vertically therethrough, said sensing means comprising:

a mounting structure having a passage therein and connectable to the exterior of said bottom wall of said container;

a stem having a stem chamber therein rigidly connected to said mounting structure and extendable through said hole in said bottom wall into said container, said stem chamber being in communication with said passage;

a magnetic reed switch having external electrical terminals therein;

electrical wires extending through said mounting structure passage and into said stem chamber and electrically connected to said electrical terminals of said reed switch;

resiliently compressible potting material in said stem chamber in which said magnetic reed switch is embedded;

means in said stem chamber for mechanically engaging said potting material to prevent axial displacement thereof;

a float mounted for axial movement on the exterior of said stem between upper and lower positions;

and a magnet secured to said float for operating said reed switch.

21. Sensing means according to claim 20 wherein said reed switch comprises a hollow glass housing, wherein said electrical terminals extend from opposite ends of said glass housing, and further including heat shrinkable tubular insulation surrounding said terminals, portions of the wires connected thereto, and portions of said glass housing.

22. Sensing means according to claim 21 wherein one of said wires lies parallel to said glass housing and extends through tubular insulation at both of said glass housing.

23. Sensing means according to claim 22 wherein said passage in said mounting structure is provided with electrical insulation therewithin.

24. Sensing means according to claim 23 wherein said electrical insulation is a liquid.

25. Sensing means according to claims 20 or 21 or 22 or 23 or 24 wherein said mounting structure comprises a plate having a plate hole therethrough, said plate being adapted to be secured to said bottom wall of said container, and an adjustment member extending into said plate hole and welded to said plate in sealed relationship, said adjustment member comprising said passage with which said stem chamber communicates.

* * * * *